(12) United States Patent
Coates

(10) Patent No.: US 8,156,915 B2
(45) Date of Patent: Apr. 17, 2012

(54) PISTON HAVING CERAMIC HEAD

(76) Inventor: George J. Coates, Wall, NJ (US)

( * ) Notice: Subject to any disclaimer, the term of this patent is extended or adjusted under 35 U.S.C. 154(b) by 304 days.

(21) Appl. No.: 12/658,124

(22) Filed: Feb. 4, 2010

(65) Prior Publication Data

US 2011/0186002 A1 Aug. 4, 2011

(51) Int. Cl.
*F02F 3/00* (2006.01)
(52) U.S. Cl. .......................... 123/193.6; 92/215; 92/256
(58) Field of Classification Search .................... 92/208, 92/213, 214, 216, 222, 248, 255, 256; 123/193.6
See application file for complete search history.

(56) References Cited

U.S. PATENT DOCUMENTS

| 4,741,253 | A | * | 5/1988 | Ogawa et al. | 92/212 |
| 4,742,759 | A | * | 5/1988 | Hayakawa | 92/176 |
| 4,848,291 | A | * | 7/1989 | Kawamura et al. | 123/193.6 |
| 5,014,604 | A | * | 5/1991 | Hirao et al. | 92/212 |
| 5,085,185 | A | * | 2/1992 | Heshmat | 123/193.6 |
| 5,282,411 | A | * | 2/1994 | Hirai et al. | 92/176 |

* cited by examiner

*Primary Examiner* — M. McMahon

(57) ABSTRACT

A piston for an internal combustion engine wherein the piston includes a piston body fabricated from a metal and a piston head fabricated from a ceramic or ceramic composite material, the ceramic or ceramic composite piston head is press fit to the piston body and secured by an internal circumferential locking ring.

5 Claims, 2 Drawing Sheets

PISTON HAVING CERAMIC HEAD

BACKGROUND OF THE INVENTION

1. Field of the Invention

The present invention relates to internal combustion engines, and in particular to the pistons associated therewith wherein the piston body is fabricated from one material, preferably a metal, and the piston head is fabricated of ceramic or ceramic composite material and joined with the metal piston body.

2. Description of the Prior Art

Pistons are an integral part of most all internal combustion engines for the transfer of the power contained in the fuel/air mixture combustion to a crank shaft, which in turn through various gearing mechanisms transfers that power to the wheels of a land vehicle, the propeller of a water vehicle, or the propeller of an airplane. The piston is tightly fitted within the cylinder of an internal combustion engine and reciprocates upwardly and downwardly within the cylinder in response to the combustion of the fuel/air mixture, and the rotation of the crank shaft to which it is secured by means of a connecting rod.

The piston itself is normally fabricated of two primary elements. First there is the piston body, which is cylindrical in shape having a plurality of annular grooves for the receipt of piston rings to effectuate a seal with the wall of the cylinder within which it reciprocates. The piston body has means positioned on its underside for the secure connection of one end of a connecting rod, the opposing end being connected to a crank shaft. The upper portion of the piston body is normally fitted with a separately fabricated piston head which would normally be welded to the piston body about their common circumferential peripheries. It is the piston head which is exposed to the heat of combustion in the cylinder. It is also the piston head which has been the subject of much redesign in order to improve the combustion within the cylinder by inducing turbulence to create a more homogeneous combustion. Piston heads have evolved from a planar circular head, to heads having an upper surface resembling a single wedge shape or multiple wedge shapes to piston heads having a dome shape which are commonly referred to as hemi-heads.

Internal combustion engines which incorporate piston bodies and piston heads made of the same or similar metal material performed adequately with conventional fuels, such as gasoline and diesel. Engineers and designers would always look for improvements to the piston body and piston head arrangement in order to improve efficiency and performance. One drawback to the conventional piston body and piston head arrangement is that with both of the elements being fabricated from the same material, the heat of combustion within the cylinder will elevate the temperature of the piston head and the piston body due to their similar characteristics. This is not critical with respect to conventional internal combustion engines operating on conventional fuel, such as gasoline or diesel, since this heat transfer will not have deleterious affect until many hundreds of thousands of miles are put on the engine.

However, with the advent of use of alternative fuels such as ethanol, or natural gas, or hydrogen, there is a need because of the heat of combustion to seek alternative materials application to the fabrication of a piston head. An ideal material for the piston head would be that of a ceramic or ceramic composite, which performs superior to metal at high temperatures without deterioration or degradation.

Attempts have been made in the past to mate a ceramic piston head to a metal piston body, but those attempts have heretofore failed to provide for a metal piston body and ceramic piston head structure of sufficient durability normally resulting in separation of the body and head.

OBJECTS OF THE INVENTION

An object of the present invention is to provide for a novel piston structure for an internal combustion engine in which the piston body is fabricated of metal and the piston head is fabricated of ceramic or ceramic composite.

Another object of the present invention is to provide for a novel piston assembly in which the piston body and the ceramic/ceramic composite piston head are pressure locked.

A still further object of the present invention is to provide for a novel piston assembly in which a metal piston body and a ceramic/ceramic composite piston head are locked in secure relationship to each other under pressure by means of an internal lock frame.

A still further object of the present invention is to provide for a novel piston assembly, including a metal piston body and a ceramic/ceramic composite piston head which will allow for the use of alternative fuels within the internal combustion engine.

A still further object of the present invention is to provide for a novel piston assembly, including a metal piston body and a ceramic/ceramics composite piston head which will disrupt heat transfer from the heat of combustion of the fuel air mixture to the piston body and other engine parts.

SUMMARY OF THE INVENTION

A piston for an internal combustion engine wherein the piston includes a piston body fabricated from a metal and a piston head fabricated from a ceramic or ceramic composite material, the ceramic or ceramic composite piston head is press fit to the piston body and secured by an internal circumferential locking ring.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
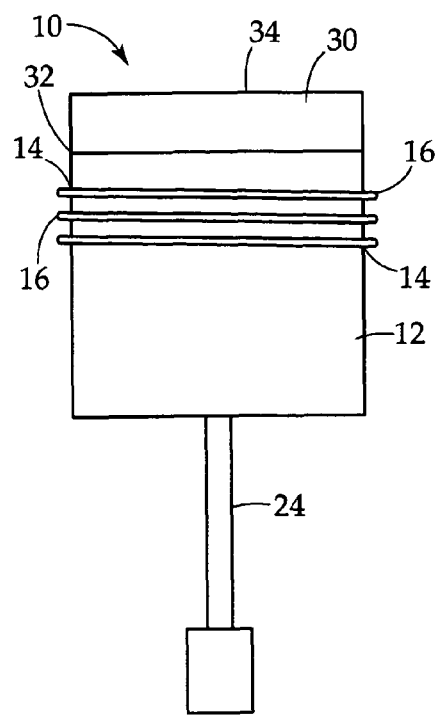
FIG. 1 is a side view of a typical piston assembly.
Figure 2:
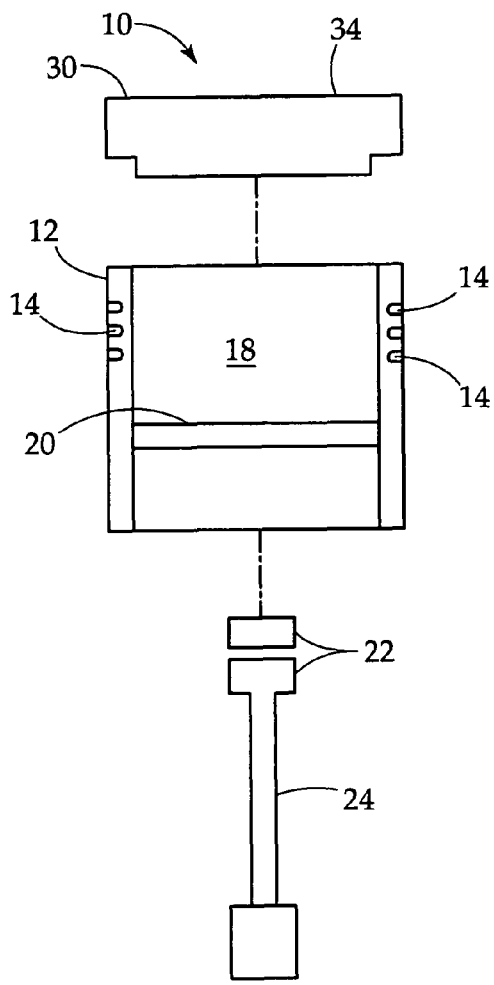
FIG. 2 is a cross sectional exploded view of a typical piston and connecting rod assembly illustrating a planar piston head.

FIG. 1 is a side view of a typical piston assembly. FIG. 2 is the cross-sectional exploded view of the piston assembly of FIG. 1. The piston assembly 10 comprises a piston body 12 cylindrical in cross-section having a plurality of annular grooves 14 for the receipt of one or more piston rings 16 which form the seal with the interior wall of a cylinder. The piston body 10 is partially hollowed defining a chamber 18 which is bisected by a connecting rod pin 20 in order to secure the upper end 22 of a connecting rod 24 to piston body 10. The lower end 26 of the connecting rod 24 is secured to a crank shaft (not shown). A piston head 30 complimentary with the circumference of piston body 10 is positioned on the upper surface 28 of piston body 10. The piston head 30 illustrated in FIGS. 1 and 2 is planar and it is secured to the piston body by a circumferential weld 32.

Figure 3:
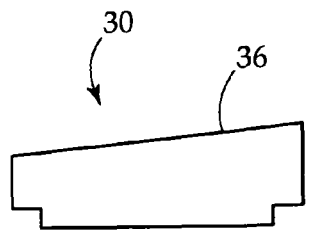
FIG. 3 is a cross-sectional view of the piston assembly of FIG. 1 illustrating a wedge piston head.
Figure 4:
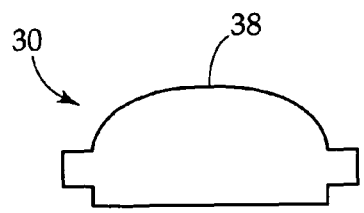
FIG. 4 is a cross-sectional view of the piston assembly of FIG. 1 illustrating a hemispherical piston head.

The piston illustrated in FIGS. 1 and 2 represents the simplest assembly of a typical piston body 12 and piston head 30, the piston head having a planar upper surface 34. Attempts to improve the turbulence and compression within the cylinder has led to the development of a variety of different shaped piston heads secured to the piston body in the same manner described. FIG. 3 is a cross-sectional view of a piston assembly in which the piston head 30 is forged or formed with a wedge shape 36. FIG. 4 is a cross-sectional view of a piston assembly in which the piston head 30 is forged or formed with a hemispherical shape 38. In both instances, the piston head 30 and piston body 12 would be secured in the manner described.

Figure 5:
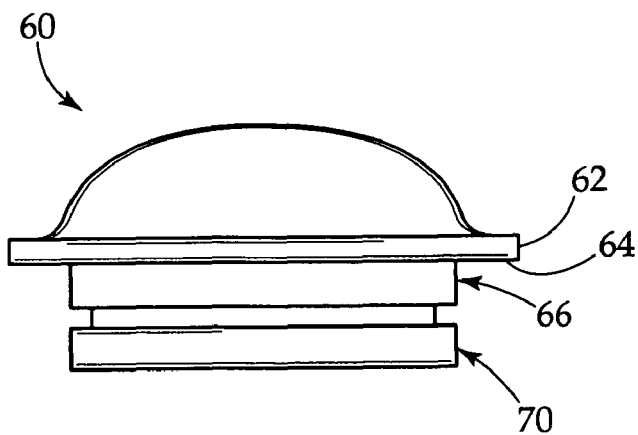
FIG. 5 is a side view of a ceramic piston head of the present invention.
Figure 6:
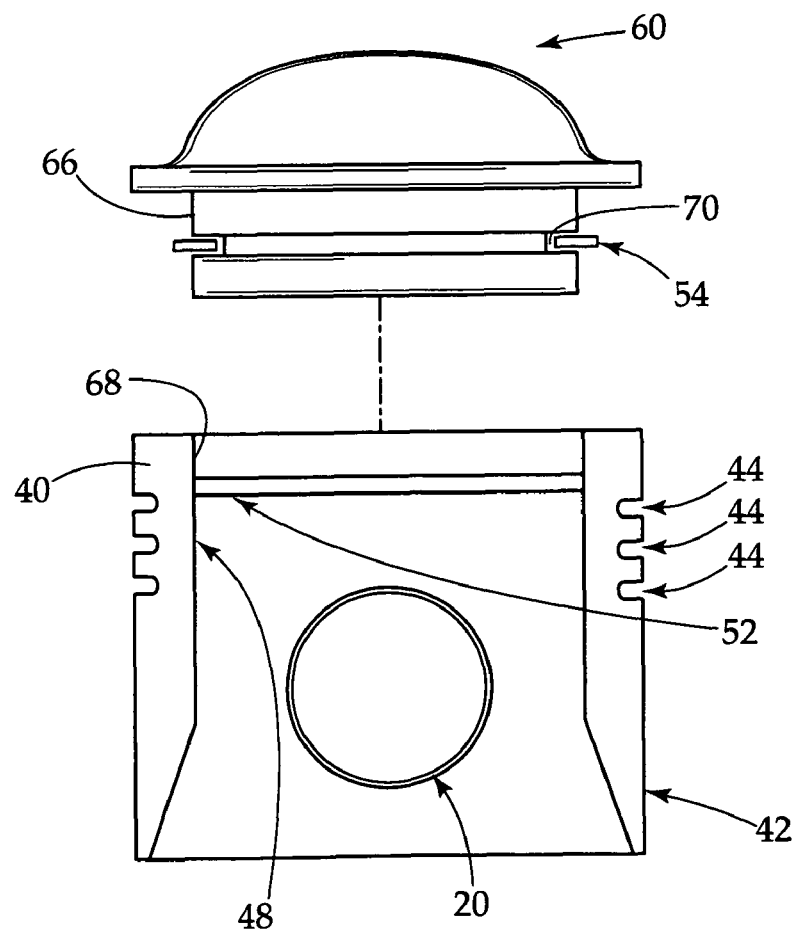
FIG. 6 is an exploded partial cross-section view of a piston body and a piston head wherein the piston body is fabricated of metal and the piston head is fabricated of ceramic or ceramic composite, the figure further illustrating the manner in which the two elements are secured.

The desire to incorporate a ceramic or ceramic composite piston head with a piston body has been hampered by the fact the ceramic or ceramic composite cannot be welded to the piston head. Therefore various means and attempts have occurred in which the ceramic or ceramic composite piston head is mechanically secured to the piston body. These attempts have failed because the mechanical securing means has proved unsatisfactory or has failed. FIG. 5 is a side view of a ceramic piston head and FIG. 6 is an exploded view of a metal piston body and a ceramic or ceramic composite piston head illustrating the manner in which the two elements are secured.

The piston body 40 is cylindrical in shape having an outer cylindrical surface 42 there being formed therein a plurality of annular grooves 44 for the receipt of a plurality of piston rings 16 which serve the same purpose as previously stated with respect to the prior art. The piston body 40 is also formed with an interior cylindrical surface 48 which is bisected at a point below its upper surface 50 by a connecting rod pin 20 for receiving and securing the upper end 22 of a connecting rod 24. The interior cylindrical surface 48 of piston body 40 is further formed with an interior annular groove 52 which is formed proximate the upper portion of piston body 40. Interior annular groove 52 will seat an annular portion of a locking ring 54.

The ceramic or ceramic composite piston head 60 is formed of a ceramic or ceramic composite material which has a low coefficient of heat transmission. Ceramic or ceramic composite piston head 60 may be formed with a planar orientation, a wedge orientation, or hemispherical orientation. The ceramic or ceramic composite piston head 60 has an outer circumference 62 complimentary with the circumference of the piston body 40. Extending downwardly from the lower surface 64 of the ceramic or ceramic composite piston head 60, is a cylindrical member 66 whose circumference is substantially identical with the inner circumference of piston body 40. Cylindrical member 66 may be in the form of a solid disk or it may be annular in configuration having its own outer and inner side walls. Cylindrical member 66 is designed to be inserted into the upper cylindrical opening 68 of piston body 40. Cylindrical member 60 is formed with its own annular groove 70 onto which is fitted locking ring 54. The design of ceramic or ceramic composite piston head 60 assures that when it is inserted into the upper opening of piston body 40, that the annular groove 70 on cylindrical member 66 is in alignment with the interior annular groove 52 on the interior cylindrical surface 48 of piston body 40.

Prior to insertion, locking ring 54 is fitted on the annular groove 70 of cylindrical member 66. The locking ring 54 can be radially compressed such that when the ceramic or ceramic composite piston head 60 is punch fit into the piston body, locking ring 54 will compress slightly so as to accommodate the inner circumference of piston body 40, and when the seating of the piston head 60 to piston body 40 is complete, with the annular groove 70 of cylindrical member 66 of piston head 60 in alignment with the interior annular groove 52 of piston body 40, locking ring 54 will expand or rebound from its compressed state, and it will then be fully encapsulated by a portion of the annular groove 70 on cylindrical member 66 and the interior annular grove 52 of piston body 40, thus locking and securing the ceramic or ceramic composite piston head 60 to the metal piston body 40.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

I claim:

1. A two piece piston for an internal combustion engine, the two piece piston comprising:
   a metal piston body portion having an outer cylindrical wall and an inner cylindrical wall defining a cylindrical bore, said outer cylindrical wall having a plurality of annular grooves for the receipt of piston rings, said inner wall having an annular groove;
   a ceramic/ceramic composite piston head of unitary construction, having an upper piston head crown, formed on a circumferential base complimentary with the circumference of said metal piston body, said circumferential complimentary base having depending there from a cylindrical disk member, the dimensions of which are complimentary with said cylindrical bore in said metal piston body, said depending cylindrical disk member having an annular groove formed thereabout;
   a locking ring secured about said annular groove of said depending cylindrical disk member, said locking ring engageable in said annular groove of said inner wall of said metal piston body when said ceramic/ceramic composite piston head is press fit into said metal piston body securing it thereto.

2. The two piece piston head for an internal combustion engine in accordance with claim 1 wherein said annular groove on said depending cylindrical disk member of said ceramic/ceramic composite piston head is aligned with said annular groove in said inner wall of said metal piston body when said ceramic/ceramic composite piston head is press fit into said cylindrical bore of said metal piston body.

3. The two piece piston head for an internal combustion engines in accordance with claim 1 wherein said lock ring is compressible in said annular groove of said depending cylindrical disk member of said ceramic/ceramic composite piston head when said ceramic/ceramic composite piston head is press fit into said cylindrical bore of said metal piston body, said locking ring expanding after said ceramic/ceramic composite piston head is seated on said metal piston body to engage both the annular groove in said internal wall of said cylindrical bore of said metal piston body and said annular groove in said depending cylindrical disk member of said ceramic/ceramic composite piston head.

4. The two piece piston head for an internal combustion engine in accordance with claim 1 wherein said plurality of said annular grooves and said outer wall of said metal piston body are for receipt of a plurality of piston rings, including but not limited to a compression ring, a back pressure ring, and a scraper ring.

5. The two piece piston for internal combustion engines in accordance with claim 1 wherein said metal piston body is formed with aligned apertures in 180 degree relationship in said inner wall and outer wall of said metal piston body for receipt of a gudgeon pin for securing said two piece piston to a connecting rod and crank shaft.

\* \* \* \* \*